United States Patent
DiMascio

(10) Patent No.: US 7,598,302 B2
(45) Date of Patent: Oct. 6, 2009

(54) ADHESION PROMOTER FOR BONDING FLUOROPOLYMER LAYERS IN A MULTI-LAYERED ARTICLE

(75) Inventor: Ramon Joseph DiMascio, Cuyahoga Falls, OH (US)

(73) Assignee: Veyance Technologies, Inc, Fairlawn, OH (US)

( * ) Notice: Subject to any disclaimer, the term of this patent is extended or adjusted under 35 U.S.C. 154(b) by 266 days.

(21) Appl. No.: 11/468,455

(22) Filed: Aug. 30, 2006

(65) Prior Publication Data

US 2008/0057247 A1  Mar. 6, 2008

(51) Int. Cl.
*C08G 73/04* (2006.01)
(52) U.S. Cl. .......................... 523/411; 568/1
(58) Field of Classification Search ................. 523/411; 568/1
See application file for complete search history.

(56) References Cited

U.S. PATENT DOCUMENTS

| | | | |
|---|---|---|---|
| 5,766,751 A | 6/1998 | Kotani et al. | |
| 5,855,977 A | 1/1999 | Fukushi et al. | |
| 5,942,298 A | 8/1999 | Sakaya et al. | |
| 6,086,764 A | 7/2000 | Linder et al. | |
| 6,489,420 B1 | 12/2002 | Duchesne et al. | |
| 6,773,755 B2 | 8/2004 | Fukushi et al. | |
| 6,908,722 B2 * | 6/2005 | Ebata et al. ............... | 430/270.1 |
| 6,960,377 B2 | 11/2005 | Shifman | |
| 2002/0039648 A1 | 4/2002 | Horpel et al. | |
| 2003/0087053 A1 | 5/2003 | Fukushi | |
| 2003/0113464 A1 | 6/2003 | Fukushi et al. | |
| 2004/0266911 A1 * | 12/2004 | Aida et al. ................... | 523/160 |
| 2005/0273947 A1 * | 12/2005 | Brun .............................. | 8/405 |
| 2006/0106265 A1 * | 5/2006 | Rivers et al. ................... | 585/15 |

FOREIGN PATENT DOCUMENTS

| | | |
|---|---|---|
| EP | 0 905 177 A1 | 3/1999 |
| EP | 1 505 327 A1 | 2/2005 |
| WO | 02/16112 A1 | 2/2002 |
| WO | 02/16131 A1 | 2/2002 |
| WO | WO0216111 A1 | 2/2002 |
| WO | 02/094912 A1 | 11/2002 |
| WO | 2004/022909 * | 3/2004 |

OTHER PUBLICATIONS

Extended European Search Report, Application No. 07115008.0-2109, dated Dec. 20, 2007.
Chemlok 5150 Adhesive for Bonding Fluoroelastomers, product information by Lord Chemical Products, Copyright 2000, 2 pages, USA.
Lord Material Safety Data Sheet, Chemlok 5150, Apr. 2, 2002, 6 pages, USA.
APC-PAA-03E, product information by Advanced Polymer, Inc., Oct. 24, 2002, 5 pages, USA.
P. Venkateswarlu, et al., Elucidation of Chemical Events Occurring in the Solid Phase During the Curing of Fluorocarbon Elastomers with Bisphenol AF, 3M Industrial Chemical Products Division, 3M Center, Oct. 10, 2002, 31 pages, USA.
Dyneon Fluoroelastomers Curing Fluoroelastomers, Dyneon LLC, a 3M Company, May 2001, 9 pages, USA.
W.W. Schmiegel, Crosslinking of Elastomeric Vinylidene Fluoride Copolymers with Nucleophiles, Die Angewandte Makromolekulare Chemie 76/77, (1979) 39-65 (Nr. 1122), Germany.

* cited by examiner

*Primary Examiner*—Kuo-Liang Peng
(74) *Attorney, Agent, or Firm*—Alvin T. Rockhill; Kathleen K. Bowen

(57) ABSTRACT

The present invention is directed to an adhesion promoter for bonding fluoropolymers and, more specifically, for bonding a fluoroplastic layer to a fluroelastomer layer in a multi-layered article, such as a fuel filler hose. In one embodiment, the adhesion promoter includes a solvent, a polyallyamine (PAA), and an organo-onium compound. The solvent can include an organic solvent, such as an alcohol, e.g., methanol, ethanol, or isopropanol. The polyallylamine includes a homopolymer of 2-propen-1-amine, and the organo-onium compound can include an organic phosphonium salt. The final composition of the adhesion promoter can include solvent in the range of about 80% by weight to about 99% by weight; polyallylamine in the range of about 0.5% by weight to about 10% by weight; and organo-onium compound in the range of about 0.5% by weight to about 10% by weight. Such adhesion promoter may further optionally include a silane, such as an organosilane.

14 Claims, 1 Drawing Sheet

ADHESION PROMOTER FOR BONDING FLUOROPOLYMER LAYERS IN A MULTI-LAYERED ARTICLE

FIELD OF THE INVENTION

The present invention is directed to an adhesion promoter for bonding fluoropolymers and, more specifically, for bonding a fluoroplastic layer to a fluroelastomer layer in a multi-layered article, such as a fuel filler hose.

BACKGROUND OF THE INVENTION

Fluoropolymers are a commercially useful and important class of materials. They can include fluoroplastics and cross-linked fluoroelastomers, such as copolymers of vinylidene fluoride with other ethylenically unsaturated halogenated monomer, e.g., hexafluoropropylene. Many of these fluoropolymers are known to exhibit high thermal stability and usefulness at high temperatures. They are also known for their extreme toughness and flexibility at very low temperatures and are almost totally insoluble in a wide variety of organic solvents. Additionally, many fluoropolymers are resistant to many chemical compounds that might degrade other classes of less resistant materials and are further recognized for their barrier properties; i.e., their ability to prevent the passage of liquids or vapors.

Increased concerns with evaporative fuel standards have led to a need for improved fuel vapor barrier properties, such as in, for example, multi-layered fuel filler hoses and other multi-layered components of automobile emission control systems, to minimize the permeation of fuel vapors. These multi-layer products can include one or more fluorinated layers, which provide an inert, vapor barrier, and one or more other layers that can add strength, rigidity, or other mechanical properties to the multi-layered article.

These multi-layered articles should not delaminate during use. That is, the adhesive bond strength between the different layers of the multi-layered article should be sufficient to prevent the different layers from separating. A variety of methods have been employed with varying levels of success to increase the adhesive bond strength between fluoropolymer layers and non-fluorinated polymer layers, such as the use of adhesives, surface treatment of layers, and the use of "tie-layers". However, there remains a need in the art for improved adhesion between fluoropolymer layers, particularly, between fluoroplastic and fluroelastomer layers. Without proper adhesion between these two layers, construction of multi-layered articles, such as fuel filler hoses, is not viable for production.

It would, therefore, be desirable to provide an adhesion promoter for bonding a fluoroplastic layer to a fluroelastomer layer in a multi-layered article, e.g., a fuel filler hose, such multi-layered article having a strong bond between these two layers and improved fuel vapor barrier layer properties.

SUMMARY OF THE INVENTION

An adhesion promoter is provided for bonding a fluoroplastic layer to a fluroelastomer layer in a multi-layered article, such as a fuel or barrier hose. In one embodiment, the adhesion promoter includes a solvent, a polyallyamine, and an organo-onium compound. The solvent can include an organic solvent, such as an alcohol, e.g., methanol, ethanol, or isopropanol. The polyallylamine includes a homopolymer of 2-propen-1-amine, and the organo-onium compound can include an organic phosphonium salt. The adhesion promoter may further optionally include a silane, such as an organosilane.

In one example, the adhesion promoter includes solvent, e.g., organic solvent, in the range of about 80% by weight to about 99% by weight; polyallylamine in the range of about 0.5% by weight to about 10% by weight; and organo-onium compound in the range of about 0.5% by weight to about 10% by weight. The optional silane may be present in the range of about 0% by weight to about 10% by weight, with the % by weight solvent being adjusted accordingly.

Other aspects of the invention include methods of bonding the fluoroplastic layer to the fluroelastomer layer for use as the multi-layered article, e.g., a fuel filler hose. The resulting fuel filler hose includes the fluroelastomer layer, which defines an inner liner; the fluoroplastic layer, which defines a barrier layer; and an adhesive interlayer situated between and bonding together the fluroelastomer and fluoroplastic layers. Such interlayer includes the polyallylamine and organo-onium compound components, and optionally silanes, from the initial adhesion promoter. The fluroelastomer layer can include an FKM fluoroelastomer and the fluoroplastic layer can include a THV fluoroplastic, both of which exhibit desirable permeation resistance.

By virtue of the foregoing, there is thus provided an adhesion promoter for bonding a fluoroplastic layer to a fluroelastomer layer in a multi-layered article, e.g., a fuel filler hose, such multi-layered article having a strong bond between these two layers and improved fuel vapor barrier layer properties.

These and other objects and advantages of the present invention shall become more apparent from the accompanying drawing and description thereof.

BRIEF DESCRIPTION OF THE DRAWINGS

The accompanying drawing, which is incorporated in and constitutes a part of this specification, illustrates an embodiment of the invention and, together with a general description of the invention given above, and the detailed description of the embodiments given below, serves to explain the principles of the invention.

DETAILED DESCRIPTION

Figure 1:
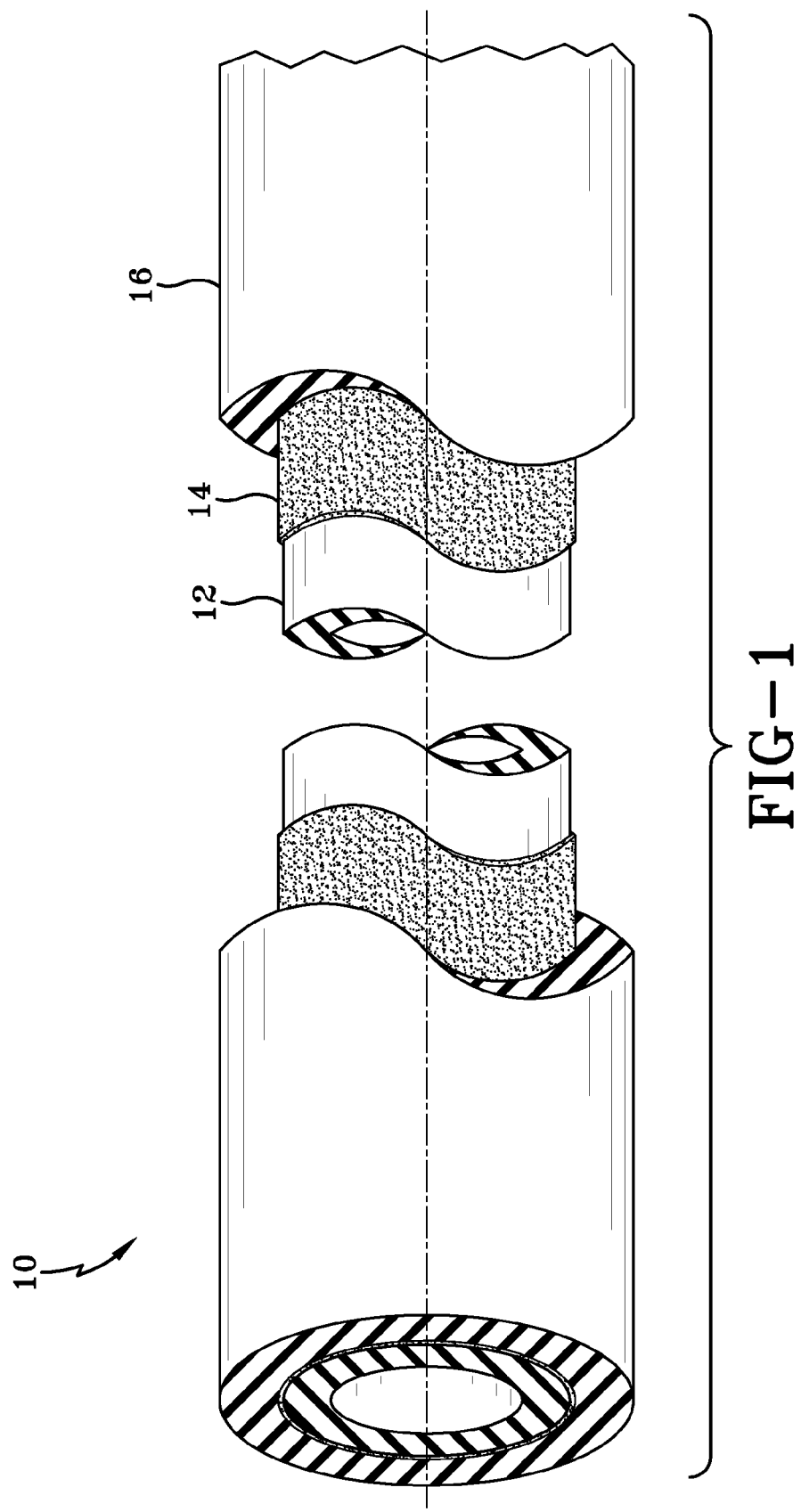
FIG. 1 is a cut-away perspective view of an embodiment of a multi-layered fuel filler hose in accordance with the present invention.

In one embodiment, an adhesion promoter for bonding a fluoroplastic layer to a fluroelastomer layer in a multi-layered article, such as a fuel or barrier hose, includes a solvent, a polyallyamine (PAA), and an organo-onium compound. Such adhesion promoter can further optionally include a silane, such as an organosilane.

The adhesion promoter may be applied to the fluoroplastic layer and/or the fluroelastomer layer. The solvent is allowed to evaporate under ambient or elevated temperatures then the layers are placed together so that adhesive interlayer 14 is situated therebetween. The layers are heated, then cooled to provide, as shown in FIG. 1, a fuel filler hose 10 including at least a fluoroelastomer layer 12 defining an inner liner, fluoroplastic layer 16 defining a barrier layer, and adhesive interlayer 14 situated between and bonding fluoroelastomer and fluoroplastic layers 12, 16. Such interlayer 14 includes the polyallylamine and organo-onium compound components, and optionally silanes, from the initial adhesion promoter.

The solvent of the adhesion promoter can include any suitable organic solvent, water, or mixture thereof. In one embodiment, the solvent is an organic solvent. In one example, the organic solvent is an alcohol, such as a lower alcohol containing from about 1 to about 4 carbon atoms, e.g., methanol, ethanol, isopropanol, or any mixture thereof.

The polyallylamine of the adhesion promoter (and resulting interlayer 14) includes a homopolymer of 2-propen-1-amine, which can be generally represented by the following formula: [—CH$_2$CH(CH$_2$NH$_2$)—]$_n$, wherein n=2 to about 175. In one example, n=15 to 75. In another example, n=18 to 53. Accordingly, the molecular weight of the polyallyamine can range from about 1000 to about 10,000.

The organo-onium compound of the adhesion promoter (and resulting interlayer 14) can include any suitable organo-onium compound, such as a quaternary organo-onium compound. In one embodiment, the quaternary organo-onium compound may be defined by relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.). In one example, the quaternary organo-onium compound includes an organic phosphonium salt represented by the following formula:

$$[P(R)_4]^+X^-$$

wherein R can be an alkyl group (including cycloalkyl groups), aryl group, alkaryl group or arylalkyl group; and X can be any halide. For example, the organic phosphonium salt may be an organic phosphonium choloride salt, such as triphenylbenzylphosphonium chloride, tributylallyl phosphonium chloride, and tributylbenzyl ammonium chloride.

The adhesion promoter (and resulting interlayer 14) may optionally include a silane compound, such as an organosilane. The organosilane can include a bis(trimethoxysilylpropyl)amine, gamma-aminopropyltriethoxysilane silylated polyazamide, or others known to those having ordinary skill in the art. Such organosilanes are available from GE Silicones.

In formulating the adhesion promoter, one or more of the components, i.e., the polyallylamine, the organo-onium compound, and the optional silane, may be provided in solution prior to mixing with another component(s), as compared to, for example, mixing each specific component directly together in an organic solvent. The solvent of the solution(s) may define part or all of the solvent of the adhesion promoter and, as described above, may include an alcohol, such as a lower alcohol containing from about 1 to about 4 carbon atoms, e.g., methanol, ethanol, isopropanol, or any mixture thereof. One such suitable polyallylamine solution, which contains 20% by weight polyallylamine in alcohol, e.g., methyl alcohol, is APC-PAA-03E available from Advanced Polymer, Inc. of Carlstadt, N.J. A suitable organic phosphonium salt solution, which also includes silane monomer, is Chemlok® 5150 available from Lord Chemical of Erie, Pa. Chemlok® 5150 contains about 4% by weight organic phosphonium chloride salt and about 10% by weight silane, in methanol.

Regardless of whether certain components are provided in solution prior to mixing or each component is added directly to the solvent, the final composition of the adhesion promoter includes solvent, such as organic solvent, in the range of about 80% by weight to about 99% by weight; polyallylamine in the range of about 0.5% by weight to about 10% by weight; and organo-onium compound in the range of about 0.5% by weight to about 10% by weight. In another example, solvent is in the range of about 84% by weight to about 97% by weight; polyallylamine is in the range of about 1.5% by weight to about 8% by weight; and organo-onium compound is in the range of about 1.5% by weight to about 8%. In yet another example, solvent is in the range of about 89% by weight to about 96% by weight; polyallylamine is in the range of about 1.5% by weight to about 7% by weight; and organo-onium compound is in the range of about 2.5% by weight to about 4%. The optional silane may be present in the range of about 0% by weight to about 10% by weight, with the % by weight solvent being adjusted accordingly.

The fluoroelastomers for use in the fluoroelastomer layer 12 include synthetic rubbers that provide desirable levels of resistance to chemicals, oil, and heat, while providing useful service life above about 200° C. The heat stability and oil resistance of these materials appear to be due, at least in part, to the high ratio of fluorine to hydrogen, the strength of the carbon-fluorine bond, and the absence of unsaturation. Fluoroelastomers may be referred to generically as FKM polymers per the nomenclature noted in ASTM D1418.

Suitable fluorine-containing ethylenically unsaturated monomers for use in the preparation of the fluoroelastomers include the terminally unsaturated monoolefins, such as hexafluoropropene (HFP), chlorotrifluoroethylene, 2-chloropentafluoropropene, perfluoroalkyl vinyl ethers, e.g., $CF_3OCF=CF_2$ or $CF_3CF_2OCF=CF_2$, tetrafluoroethylene (TFE), 1-hydropentafluoropropene, 2-hydropentafluoropropene, dichlorodifluoroethylene, trifluoroethylene, 1,1-dichlorofluoroethylene, vinylidene fluoride, vinyl fluoride, and mixtures thereof. Fluorine-free terminally unsaturated monoolefin comonomers, e.g., ethylene or propylene, may also be used as comonomers.

In one embodiment, the fluoroelastomer (FKM) is defined by the terpolymer consisting of vinylidene fluoride (VF2), hexafluoropropylene (HFP), and tetrafluoroethylene (TFE). A suitable FKM terpolymer of tetrafluoroethylene, hexafluoropropylene, and vinylidene fluoride may include about 24% weight percent tetrafluoroethylene, about 43% weight percent hexafluoropropylene, and about 33% weight percent vinylidene fluoride, with 100 weight percent of the monomer weight of the terpolymer made up from the combination of tetrafluoroethylene, hexafluoropropylene and vinylidene fluoride. These terpolymers are generally crosslinked using a poly-hydroxy cure system, which includes a crosslinker, such as bisphenol AF, and a phase transfer catalyst, such as benzyltriphenyl phosphonium chloride (BTPPC). The FLUOREL™ brand of fluoroelastomers available from the 3M Company of Minnesota, the VITON™ brand available from DuPont Performance Elastomers, or the TECHNOFLON™ brand available from Solvay Solexis are all suitable FKM fluoroelastomer terpolymers.

Suitable curative agents for the fluoroelastomers may include peroxides or other free radical initiators, dihydroxy-containing compounds (e.g., Bisphenol AF), and diamines (e.g., Diak #3), for example, which are selected and used in conventional amounts. Depending upon the cure system selected for the fluoroelastomer, cure site monomers may be required.

The fluoroplastics for use in the fluoroplastic layer 16 can include fluoroplastic quadpolymers and terpolymers (THV), and polyvinylidene fluorides (PVDF). In one embodiment, the fluoroplastic in layer 16 is a fluoroplastic quadpolymer (THV).

Suitable fluoroplastic quadpolymers (THV) are derived from (i) tetrafluoroethylene (TFE), (ii) vinylidene fluoride (VF2), (iii) at least one ethylenically unsaturated monomer of the formula $CF_2=CFR_f$ where $R_f$ is a perfluoroalkyl or a perfluoroalkoxy of 1 to 8 carbon atoms, and (iv) a perfluorovinyl ether of the formula $CF_2=CF-(OCF_2CF(R_f))_aOR'_f$, where $R_f$ is as described in (iii), $R'_f$ is a perfluoroaliphatic, such as a perfluoroalkyl or a perfluoroalkoxy, of 1 to 8 carbon atoms, and a has a value of 0 to 3. A suitable thermoplastic quadpolymer may include about 30-85 weight percent tetrafluoroethylene, about 5-55 weight percent vinylidene fluoride, about 5-50 weight percent of the unsaturated monomer having the formula $CF_2=CFR_f$, and about 0.1-15 weight percent of the perfluorovinyl ether. These THV fluoroplastics can include a melting point range of about 120° C. to about 230° C. Such THV quadpolymer fluoroplastics include the THV-800 series, e.g., THV-815, available from Dyneon LLC of Oakdale, Minn.

Suitable fluoroplastic terpolymers (THV) are derived from tetrafluoroethylene, hexafluoropropylene, and vinylidene fluoride. A suitable thermoplastic terpolymer of tetrafluoroethylene, hexafluoropropylene, and vinylidene fluoride may include about 30-75 weight percent tetrafluoroethylene, about 5-40 weight percent hexafluoropropylene, and about 5-55 weight percent vinylidene fluoride, with 100 weight percent of the monomer weight of the terpolymer made up from the combination of tetrafluoroethylene, hexafluoropropylene, and vinylidene fluoride. These THV fluoroplastics can include a melting point range of about 120° C. to about 230° C. Such THV terpolymer fluoroplastics include the THV-200, 300, 400, 500, and 600 series available from Dyneon LLC of Oakdale, Minn.

Additional additives known in the art may be provided in the fluoropolymers to provide a desired compound having desired physical properties. Such known and commonly used additive materials are activators, retarders and accelerators, processing oils, resins including tackifying resins, plasticizers, fatty acids, zinc oxide, waxes, antidegradant, antiozonants, and peptizing agents. As known to those having ordinary skill in the art, depending on the intended use of the fluoropolymers, the additives mentioned above are selected and used in conventional amounts.

The mixing of fluoropolymer, particularly, the rubber compounds, can be accomplished by methods known to those having ordinary skill in the art. For example, the ingredients are typically mixed in at least two stages, namely, at least one non-productive stage followed by a productive mix stage. Final curatives are typically mixed in the final stage, which is conventionally called the "productive" mix stage in which the mixing typically occurs at a temperature, or ultimate temperature, lower than the vulcanization temperature of the elastomer. The terms "non-productive" and "productive" mix stages are well known to those having skill in the rubber mixing art.

Methods known in the fluoropolymer art may be used to produce a bonded multilayer article 10 wherein the fluoroplastic layer 16 is bonded with the fluoroelastomer layer 12. For instance, the fluoroplastic and fluoroelastomer can be formed into thin film layers 12, 16 by known methods. The surface of one or both layers 12, 16 can be treated with the adhesion promoter prior to forming the layered article 10. It is further contemplated that the adhesion promoter may be mixed into the fluoroplastic layer 16 and/or fluoroelastomer layer 12. The solvent is allowed to evaporate under ambient or elevated temperatures then the layers are placed together so that adhesive interlayer 14 is situated therebetween. The fluoroplastic layer 16 and the fluoroelastomer layer 12 can then be laminated together under heat and pressure to form a bonded, multi-layered article, such as fuel filler hose 10. In other embodiments, an additional layer(s) (not shown) known to those having ordinary skill in the art may be added to the fuel filler hose 10, such as a friction layer, e.g., nitrile rubber layer, a textile reinforcing layer, e.g., aramid, and a cover, e.g., standard elastomeric cover.

A cure step is necessary to fully establish the desired physical properties in the fluoroelastomer layer 12 of any finished article 10. Such cure step may include exposure to an elevated temperature, such as an autoclave treatment. This step may be in addition to the thermal exposure of the other process steps, e.g., lamination or coextrusion. Or, conditions may be found which accomplish both the bonding and curing within the same temperature and pressure ranges.

Without being held to a single theory, the organo-onium compound of the adhesion promoter is understood to defluorinate the vinylidene component of the fluoroelastomer and fluoroplastic, such defluorination occurring in a basic condition, brought about by the polyallyamine, thus, allowing the layers 12, 16 to crosslink and form a strong bond therebetween.

In one embodiment and with reference to FIG. 1, a fuel filler hose 10, such as one suitable for pumping gasoline, is formed by extruding the fluoroelastomer in a tubular shape defining layer 12 by methods known to those having ordinary skill in the art. The adhesion promoter, which includes an organic solvent, a polyallylamine, and an organo-onium compound, is then sprayed on the surface of the fluoroelastomer layer 12. Sufficient time is allowed for the organic solvent to evaporate under ambient conditions. Then, the fluoroplastic is similarly extruded in a tubular shape defining layer 16 and further situated about layer 12 so that the layers 12, 16 are in contact, with interlayer 14 being situated therebetween. The layers 12, 16 then are heated so that the fluorelastomer layer can cure. In one embodiment, the heating occurs in the range of about 160° C. to about 182° C., respectively, for about 60 minutes to about 25 minutes, at a pressure of approximately 70 psig. The multi- or bi-layered article 10 is allowed to cool in a controlled fashion to less than 200° F. in approximately 20 minutes under pressure of at least 70 psig. Accordingly, the resulting fuel filler hose 10 includes the fluoroelastomer layer 12, which defines an inner liner; the fluoroplastic layer 16, which defines a barrier layer; and the adhesive interlayer 14 that is situated between and bonding the fluoroelastomer and fluoroplastic layers 12, 16. Such interlayer 14 includes the polyallylamine and organo-onium compound components, and optionally silanes, from the initial adhesion promoter.

Non-limiting examples of the adhesion promoter in accordance with the description are disclosed below. Such examples are merely for the purpose of illustration and are not to be regarded as limiting the scope of the invention or the manner in which it can be practiced. Other examples will be appreciated by a person having ordinary skill in the art.

An FKM fluoroelastomer composition was prepared and evaluated for adhesion to a fluoroplastic composition using an adhesion promoter in accordance with the present invention. Both compositions were compounded by methods known to those having ordinary skill in the art and provided as fluoropolymer layers 12, 16 for use in fuel filler hose 10. The FKM fluoroelastomer included FE-5830Q, which is a terpolymer fluoroelastomer available from Dyneon LLC of Oakdale, Minn. The fluoroplastic included THV815, which is a quadpolymer fluoroplastic available from Dyneon LLC of Oakdale, Minn.

Multi-layered samples were constructed of a THV815 layer covered with an FKM layer that had been coated with a desired adhesion promoter, as further described below, so that the adhesion promoter was situated between the layers. Samples were cured at 182° C. for 25 minutes in a platen press having a bladder pressure of 100 psig, then removed and left to cool and equilibrate for at least 18 hours prior to running adhesion tests on an Instron tester per ASTM D 413-98. Data in Table 1 shows adhesion results, including observations, where the adhesion promoter contained varying amounts of only a polyallyamine in methanol, expressed as a percentage by weight in the solution. This polyallyamine solution was APC-PAA-03C available from Advanced Polymer, Inc. of Carlstadt, N.J., which is a 20% polyallyamine solution in methanol, such solution being further diluted with additional methanol to obtain the desired percent polyallyamine as indicated in Table 1. The polyallylamine in solution was a homopolymer of 2-propen-1-amine which included a molecular weight of about 3000.

TABLE 1

| Sample | Adhesion Promoter (in $CH_4$) | Average Instron reading (lbs/in) | Observation |
|---|---|---|---|
| 1 | 1% PAA | 0.0 | No rubber adhesion |
| 2-4 | 2% PAA | 4.07 | Blisters, no adhesion |
| 5-7 | 5% PAA | 13.5 | Mixed rubber tear and blisters |
| 8 | 10% PAA | 10.7 | Mixed rubber tear and blisters |

Data in Table 2 shows adhesion results, including observations, where the adhesion promoter contained varying amounts of APC-PAA-03C [the PAA solution of Table 1] and 10 ml of Chemlok® 5150 available from Lord Chemical, which contains about 4% by weight organic phosphonium chloride salt and about 10% by weight silane, in methanol. Accordingly, the final compositions (excluding the control) included from about 1.8% to about 6.6% by weight polyallylamine; from about 2.7% to about 3.6% by weight organic phosphonium chloride salt; from about 9.1% to about 6.7% by weight silane, with the remainder being methanol.

TABLE 2

| Sample | Adhesion Promoter (in $CH_4$) | Average Instron reading (lbs/in) | Observation |
|---|---|---|---|
| 1 (control) | Chemlok ® 5150 alone | 2.2 | Rubber tear and blisters |
| 2-3 | 1 ml PAA | 16.5 | Rubber tear in one sample and no rubber tear in other sample |
| 4-5 | 2 ml PAA | 9.1 | Poor rubber adhesion |
| 6-7 | 3 ml PAA | 15.6 | Rubber tear and blisters |
| 8-9 | 4 ml PAA | 21.3 | 100% rubber tear |
| 10 | 5 ml PAA | 21.7 | 100% rubber tear |

The preceding tables summarize the results for adhesion of the FKM fluroelastomer layer to the THV815 fluoroplastic layer using the various adhesion promoters. Generally, a value of greater than 15 lbs/in indicated satisfactory adhesion while Instron test results that were greater than 20 lbs/in of force showed uniform rubber tear and good adhesion. In view thereof, it was determined that mixtures of the Chemlok® 5150 and 4 to 5 ml of the PAA solution worked the best. Such results are believed related to a synergistic effect of the polyallylamine and the organic phosphonium chloride salt, which is understood to be particularly evident when the data in Table 1 is compared to the data in Table 2.

In addition, although the results indicate that the combination of the Chemlok® 5150 and 4 to 5 ml of the PAA solution achieve superior adhesion, there does appear to be some variability in the results generally. This variability may be due to many causes such as, for example, cure temperature and time, moisture/humidity, adhesion promoter application technique, formulation of the adhesion promoter, compound formulation, compound age, differences in FKM and THV structure and chemistry, etc.

While the present invention has been illustrated by the description of embodiments, and while the illustrative embodiments have been described in considerable detail, it is not the intention of the inventors to restrict or in any way limit the scope of the appended claims to such detail. Additional advantages and modifications readily will appear to those skilled in the art. The invention in its broader aspects is therefore not limited to the specific details, representative apparatus and methods, and illustrative examples shown and described. Accordingly, departures may be made from such details without departing from the scope of the inventors' general inventive concept.

What is claimed is:

1. An adhesion promoter comprising:
   a solvent;
   a polyallylamine defined by the structural formula: [—$CH_2CH(CH_2NH_2)$—]$_n$, wherein n=2 to about 175;
   an organo-onium compound; and
   a silane compound.

2. The adhesion promoter of claim 1 wherein organo-onium compound is an organic phosphonium salt.

3. The adhesion promoter of claim 1 wherein the solvent is an organic solvent.

4. The adhesion promoter of claim 3 wherein the organic solvent is a lower alcohol containing from about 1 to about 4 carbon atoms.

5. The adhesion promoter of claim 1 wherein the solvent is an alcohol, the polyallylamine is defined by the structural formula: [—$CH_2CH(CH_2NH_2)$—]$_n$, wherein n=2 to about 175, and the organo-onium compound is an organic phosphonium salt.

6. The adhesion promoter of claim 1 comprising:
   about 80% by weight to about 99% by weight solvent;
   about 0.5% by weight to about 10% by weight polyallylamine;
   about 0.5% by weight to about 10% by weight organo-onium compound; and greater than 0% by weight to about 10% by weight silane compound.

7. The adhesion promoter of claim 6 wherein the polyallylamine is defined by the structural formula: [—$CH_2CH(CH_2NH_2)$—]$_n$, wherein n=2 to about 175.

8. The adhesion promoter of claim 6 wherein organo-onium compound is an organic phosphonium salt.

9. The adhesion promoter of claim 6 wherein the solvent is an organic solvent.

10. The adhesion promoter of claim 6 wherein the solvent is an alcohol, the polyallylamine is defined by the structural formula: [—$CH_2CH(CH_2NH_2)$—]$_n$, wherein n=2 to about 175, and the organo-onium compound is an organic phosphonium salt.

11. The adhesion promoter of claim 6 wherein the solvent is in the range of about 89% by weight to about 96% by weight; the polyallylamine is in the range of about 1.5% by weight to about 7% by weight; the organo-onium compound is in the range of about 2.5% by weight to about 4% by weight, and the silane compound is in the range of about 6.7% by weight to about 10% by weight silane compound.

12. An adhesion promoter comprising:
about 80% by weight to about 99% by weight alcohol;
about 0.5% by weight to about 10% by weight polyallylamine defined by the structural formula: [—CH$_2$CH(CH$_2$NH$_2$)—]$_n$, wherein n=2 to about 175; and
about 0.5% by weight to about 10% by weight organic phosphonium salt.

13. The adhesion promoter of claim 12 wherein the alcohol is a lower alcohol containing from about 1 to about 4 carbon atoms.

14. The adhesion promoter of claim 12 wherein the alcohol is in the range of about 89% by weight to about 96% by weight; the polyallylamine is in the range of about 1.5% by weight to about 7% by weight; and the organic phosphonium salt is in the range of about 2.5% by weight to about 4% by weight.

* * * * *